(12) United States Patent
Dhawan et al.

(10) Patent No.: US 7,853,888 B1
(45) Date of Patent: Dec. 14, 2010

(54) METHODS AND APPARATUS FOR DISPLAYING THUMBNAILS WHILE COPYING AND PASTING

(75) Inventors: Anmol Dhawan, Ghaziabad (IN); Sachin Soni, Delhi (IN); Sachin Gaur, Ghaziabad (IN); Ganesh Sahai, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 756 days.

(21) Appl. No.: 11/652,980

(22) Filed: Jan. 12, 2007

(51) Int. Cl.
*G06F 3/048* (2006.01)
(52) U.S. Cl. ...................... 715/770; 715/838
(58) Field of Classification Search .............. 715/770, 715/838, 825, 769
See application file for complete search history.

(56) References Cited

U.S. PATENT DOCUMENTS

| | | | |
|---|---|---|---|
| 6,307,550 B1 * | 10/2001 | Chen et al. .................. | 345/418 |
| 7,185,274 B1 * | 2/2007 | Rubin et al. ................. | 715/205 |
| 2005/0102629 A1 * | 5/2005 | Chen et al. ................... | 715/770 |
| 2005/0183026 A1 * | 8/2005 | Amano et al. ............... | 715/764 |

* cited by examiner

*Primary Examiner*—Steven P Sax
*Assistant Examiner*—Andrey Belousov

(57) ABSTRACT

A system provides for a clipboard manager for showing thumbnails in a clipboard while editing a document via a clipboard manager. The clipboard manager allows a user to select data from a second document. Upon selection, the clipboard manager generates a thumbnail that distinctly represents the data and stores the thumbnail and data in a clipboard. The thumbnail contains a miniaturized view of the data. The clipboard manager further allows the user to identify a paste location in the document that is to be edited. The clipboard manager displays the thumbnail in the clipboard in response to the user selecting a paste command. The user can employ the clipboard manager to insert the data at the paste location by selecting the thumbnail from the clipboard.

9 Claims, 8 Drawing Sheets

METHODS AND APPARATUS FOR DISPLAYING THUMBNAILS WHILE COPYING AND PASTING

BACKGROUND

Conventional software applications operate on computer systems to allow people to create, process and edit documents. Specifically, conventional word processing applications run on such computer systems and allow a user to create and edit digital documents by inserting and manipulating text. In one configuration, conventional systems provide users with a clipboard functionality to store text for future use during editing. The clipboard can be a software window or graphical user interface displaying the stored text via standardized icons. Such icons represent the document type or document format of the stored text. As the user encounters portions of a document that can be edited with the stored text, the user can select and activate the clipboard functionality from a centralized menu in the word processing application. Upon selecting the clipboard functionality, the clipboard is displayed to the user and allows the user to select an icon and execute a paste command, thereby inserting the stored text in the document.

SUMMARY

Conventional techniques for clipboard functionalities suffer from a variety of deficiencies. In particular, conventional techniques require the user to activate the clipboard functionality from a centralized menu in order to display the clipboard. As an example, if a user has text stored in the clipboard, the user must scroll through a menu for the clipboard functionality and select the clipboard functionality in order to view the clipboard. Once the clipboard is displayed, it shows the copied text as a standardized icon. This process of requiring the user to scroll through a menu to find the clipboard functionality and requiring an explicit selection of the clipboard functionality is cumbersome and adds steps to the editing process. Yet another deficiency is the use of standardized icons. Such standardized icons do not provide the user with sufficient context regarding the content of the text stored in the clipboard.

Embodiments disclosed herein significantly overcome such deficiencies and provide mechanisms and techniques that allow for the ability to display a clipboard that stores distinct thumbnails of data while not requiring the user to use a centralized menu to activate the clipboard functionality. As an example, a user can select multiple paste destinations from a variety of documents, whereby each paste destination can be stored as a unique thumbnail in the clipboard. Each unique thumbnail distinctly represents a paste destination. The user can open a new document and search the new document for desired text. Once the user has found such desired text, the user can highlight the desired text and can select a paste command which activates the clipboard, instead of scrolling through a centralized menu. Upon selection of the paste command, the clipboard is activated and displays the distinct thumbnails. By selecting a thumbnail, the highlighted text gets inserted at the paste destination represented by the user-selected thumbnail. Therefore, the need to search for the clipboard functionality in a centralized menu and to explicitly select the clipboard functionality is eliminated. Additionally, the use of distinct thumbnails to represent content in the clipboard provides the user with sufficient information during the editing process. Another advantage is that the clipboard functionality presents the clipboard proximate to the desired text. Thus, there is no need for the user to waste time dragging objects from the clipboard to a particular location in the document.

In yet another example, the user can select multiple graphics (e.g. graphical shapes, digital photos, or symbols) from a document, whereby each graphic can be stored as a distinct thumbnail in the clipboard. Specifically, each thumbnail distinctly represents a graphic by providing a miniaturized view of the graphic, thereby providing the user with sufficient information and context during the editing process. The user can open a new document and search for a paste location within the new document. Once the user has found such desired paste location, the user can highlight the paste location or can simply place a cursor at the paste location with a computer mouse. With a right-click action on the computer mouse or by inputting a hot-key combination into a computer keyboard, the user can select a paste command to activate the clipboard instead of scrolling through a centralized menu. Upon selection of the paste command, the clipboard is activated and displays the distinct thumbnails. By selecting a thumbnail, the graphic represented by the selected thumbnail gets inserted into the paste location. Again, the need to search for the clipboard functionality in a centralized menu and to explicitly select the clipboard functionality is eliminated. Another advantage is that the clipboard functionality presents the clipboard proximate to the desired text. Thus, there is no need for the user to waste time dragging objects from the clipboard proximate to the paste location.

More specifically, embodiments disclosed herein provide for showing thumbnails in a clipboard while editing a document via a clipboard manager. The clipboard manager allows a user to select data from a second document. Upon selection, the clipboard manager generates a thumbnail that distinctly represents the data and stores the thumbnail and data in a clipboard. The thumbnail contains a miniaturized view of the data. The clipboard manager further allows the user to identify a paste location in the document that is to be edited. The clipboard manager displays the thumbnail in the clipboard in response to the user selecting a paste command. The user can employ the clipboard manager to insert the data at the paste location by selecting the thumbnail from the clipboard.

In another embodiment disclosed herein, the user can employ the clipboard manager to select a paste destination in the document. The clipboard manager generates a second thumbnail that distinctly represents the paste destination and stores the thumbnail and the paste destination in the clipboard. The second thumbnail that distinctly represents the paste destination contains a miniaturized view of a portion of the document, the paste destination located within said portion. The user further employs the clipboard manager to select data from the second document. In response to the user selecting a "paste to" command, the clipboard manager displays the second thumbnail in the clipboard. The clipboard manager then inserts the data from the second document at the paste destination once the user selects the second thumbnail from the clipboard.

Other embodiments disclosed herein include any type of computerized device, workstation, handheld or laptop computer, or the like configured with software and/or circuitry (e.g., a processor) to process any or all of the computer-implemented method operations disclosed herein. In other words, a computerized device such as a computer or a data communications device or any type of processor that is programmed or configured to operate as explained herein is considered an embodiment disclosed herein. Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
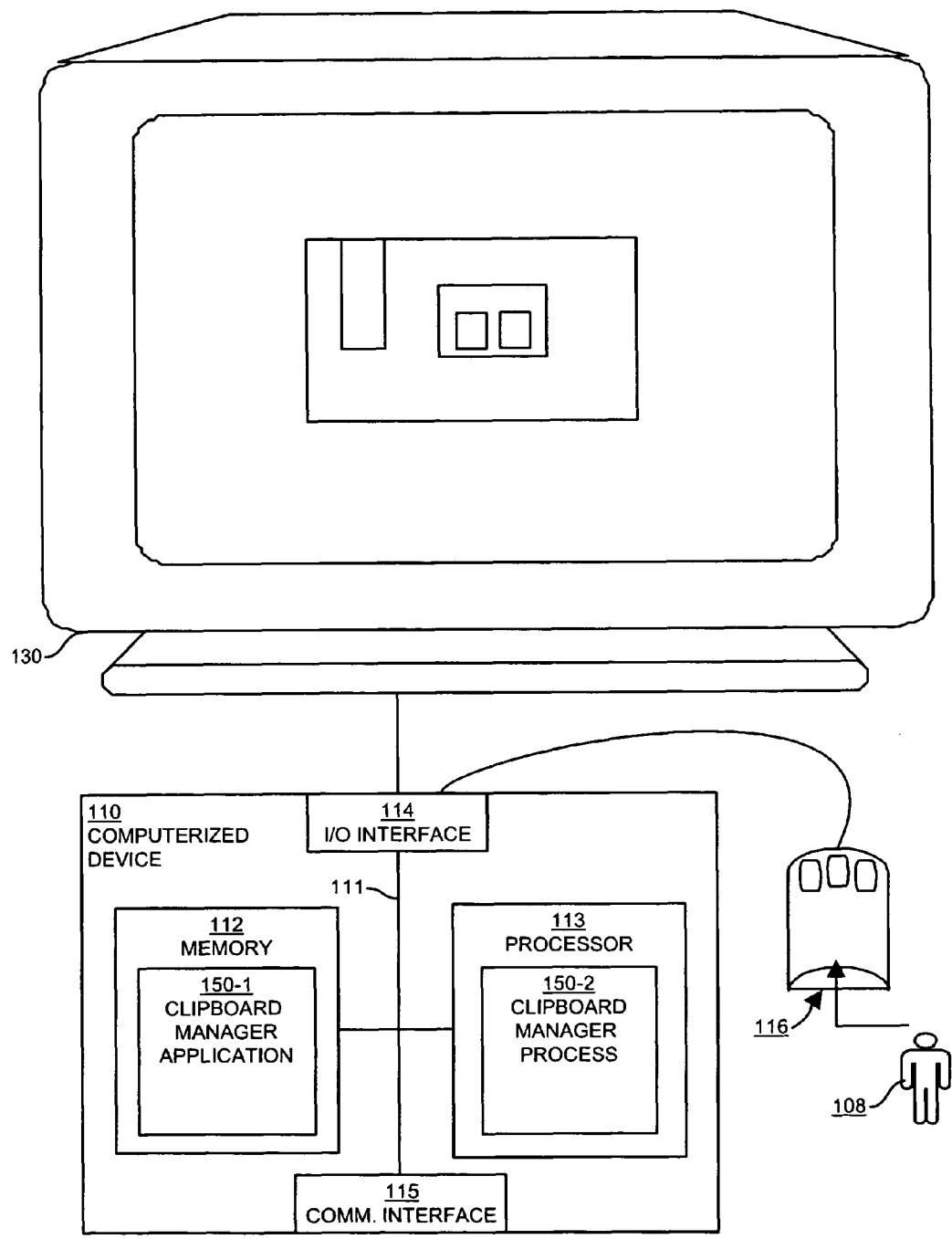
FIG. 1 is a block diagram of a computerized system configured with an application including a clipboard manager in accordance with one embodiment of the invention.

Embodiments disclosed herein include methods, software and a computer system that display a clipboard with thumbnails that distinctly represent data while editing a document. As an example, if a user has text stored in the clipboard, the user must scroll through a menu for the clipboard functionality and select the clipboard functionality in order to view the clipboard. Once the clipboard is displayed, it shows the copied text as a standardized icon. This process of requiring the user to scroll through a menu to find the clipboard functionality and requiring an explicit selection of the clipboard functionality is cumbersome and adds steps to the editing process. Yet another deficiency is the use of standardized icons. Such standardized icons do not provide the user with sufficient context regarding the content of the text stored in the clipboard.

Embodiments disclosed herein significantly overcome such deficiencies and provide mechanisms and techniques that allow for the ability to display a clipboard that stores distinct thumbnails of data while not requiring the user to use a centralized menu to activate the clipboard functionality. As an example, a user can select multiple paste destinations from a variety of documents, whereby each paste destination can be stored as a unique thumbnail in the clipboard. Each unique thumbnail distinctly represents a paste destination. The user can open a new document and search the new document for desired text. Once the user has found such desired text, the user can highlight the desired text and can select a paste command which activates the clipboard, instead of scrolling through a centralized menu. Upon selection of the paste command, the clipboard is activated and displays the distinct thumbnails. By selecting a thumbnail, the highlighted text gets inserted at the paste destination represented by the user-selected thumbnail. Therefore, the need to search for the clipboard functionality in a centralized menu and to explicitly select the clipboard functionality is eliminated. Additionally, the use of distinct thumbnails to represent content in the clipboard provides the user with sufficient information during the editing process.

In yet another example, the user can select multiple graphics (e.g. graphical shapes, digital photos, or symbols) from a document, whereby each graphic can be stored as a distinct thumbnail in the clipboard. Specifically, each thumbnail distinctly represents a graphic by providing a miniaturized view of the graphic, thereby providing the user with sufficient information and context during the editing process. The user can open a new document and search for a paste location within the new document. Once the user has found such desired paste location, the user can highlight the paste location or can simply place a cursor at the paste location with a computer mouse. With a right-click action on the computer mouse or by inputting a hot-key combination into a computer keyboard, the user can select a paste command to activate the clipboard instead of scrolling through a centralized menu. Upon selection of the paste command, the clipboard is activated and displays the distinct thumbnails. By selecting a thumbnail, the graphic represented by the selected thumbnail gets inserted into the paste location. Again, the need to search for the clipboard functionality in a centralized menu and to explicitly select the clipboard functionality is eliminated.

More specifically, embodiments disclosed herein provide for showing thumbnails in a clipboard while editing a document via a clipboard manager. The clipboard manager allows a user to select data from a second document. Upon selection, the clipboard manager generates a thumbnail that distinctly represents the data and stores the thumbnail and data in a clipboard. The thumbnail contains a miniaturized view of the data. The clipboard manager further allows the user to identify a paste location in the document that is to be edited. The clipboard manager displays the thumbnail in the clipboard in response to the user selecting a paste command. The user can employ the clipboard manager to insert the data at the paste location by selecting the thumbnail from the clipboard.

In another embodiment disclosed herein, the user can employ the clipboard manager to select a paste destination in the document. The clipboard manager generates a second thumbnail that distinctly represents the paste destination and stores the thumbnail and the paste destination in the clipboard. The second thumbnail that distinctly represents the paste destination contains a miniaturized view of a portion of the document, the paste destination located within said portion. The user further employs the clipboard manager to select data from the second document. In response to the user selecting a "paste to" command, the clipboard manager displays the second thumbnail in the clipboard. The clipboard manager then inserts the data from the second document at the paste destination once the user selects the second thumbnail from the clipboard.

FIG. 1 is a block diagram illustrating example architecture of a computer system 110 that executes, runs, interprets, operates or otherwise performs a clipboard manager application 150-1 and clipboard manager process 150-2 configured in accordance with embodiments of the invention. The computer system 110 may be any type of computerized device such as a personal computer, workstation, portable computing device, console, laptop, network terminal or the like. As shown in this example, the computer system 110 includes an interconnection mechanism 111 such as a data bus, motherboard or other circuitry that couples a memory system 112, a processor 113, an input/output interface 114, and a communications interface 115. An input device 116 (e.g., one or more user/developer controlled devices such as a keyboard, mouse, touch pad, etc.) couples to the computer system 110 and processor 113 through an input/output (I/O) interface 114 and enables a user 108 to provide input signals in order to implement and perform the clipboard manager application 150-1 and process 150-2 provides on the computer display 130.

The memory system 112 is any type of computer readable medium and in this example is encoded with a clipboard manager application 150-1 that supports generation, display, and implementation of functional operations as explained herein. The clipboard manager application 150-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the clipboard manager application 150-1. Execution of the clipboard manager application 150-1 in this manner produces processing functionality in a clipboard manager process 150-2. In other words, the process 150-2 represents one or more portions or runtime instances of the application 150-1 (or the entire application 150-1) performing or executing within or upon the processor 113 in the computerized device 110 at runtime.

Finally, a person having ordinary skill in the art would understand that the clipboard manager application 150-1 and the clipboard manager process 150-2 include a clipboard and related clipboard functionality. Such a clipboard can be a software program that can be used for short-term storage of data, such as text and graphics, as it is transferred between documents or software applications via copy, paste and other editing commands. The clipboard can be a part of a graphical user environment and can be implemented as a temporary block of memory that can be accessed from most or all programs within the environment.

Figure 2:
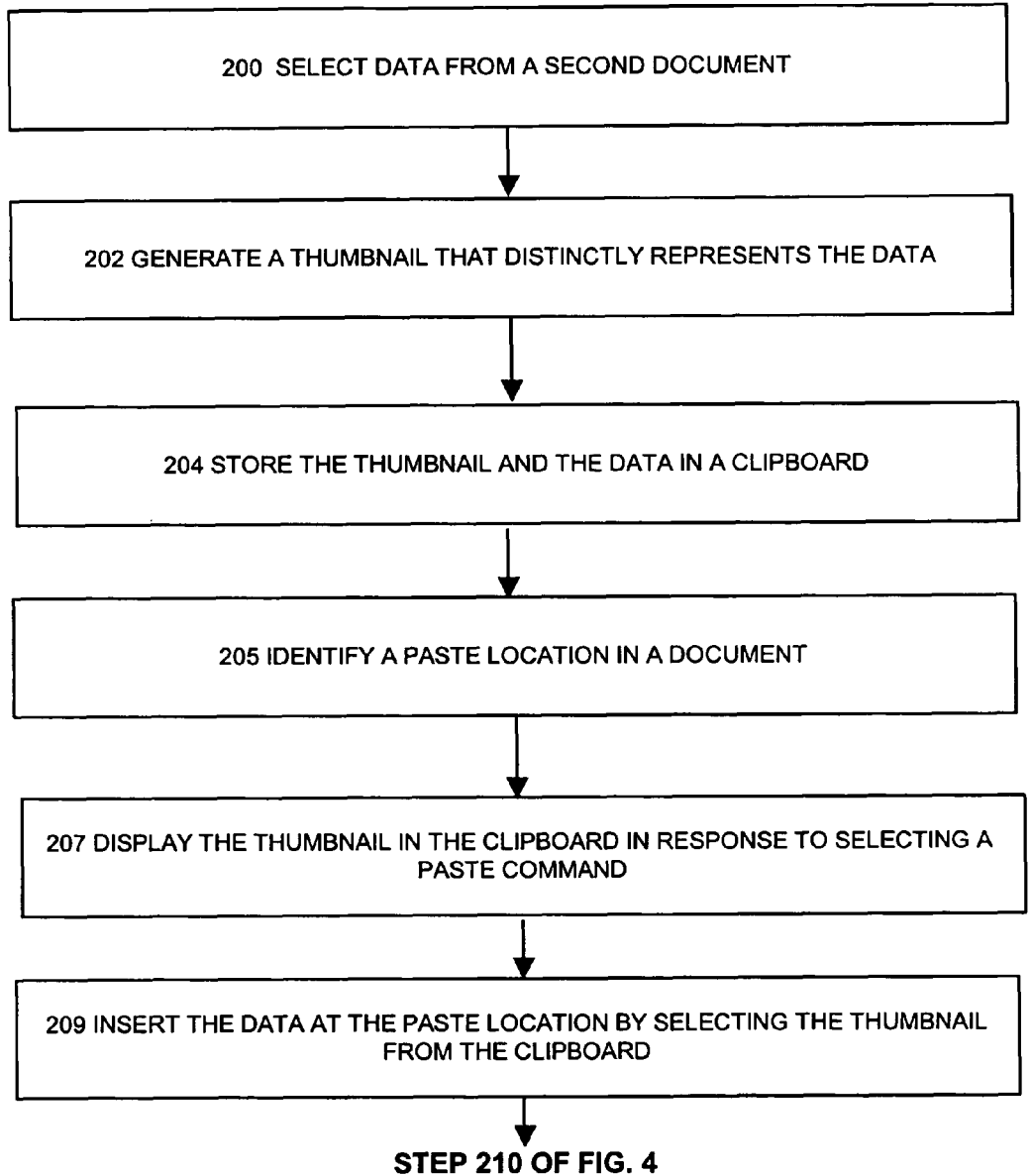
FIG. 2 is a flow chart of processing steps that show high-level processing operations performed by a clipboard manager to display a clipboard with a thumbnail that distinctly represents data.
Figure 3:
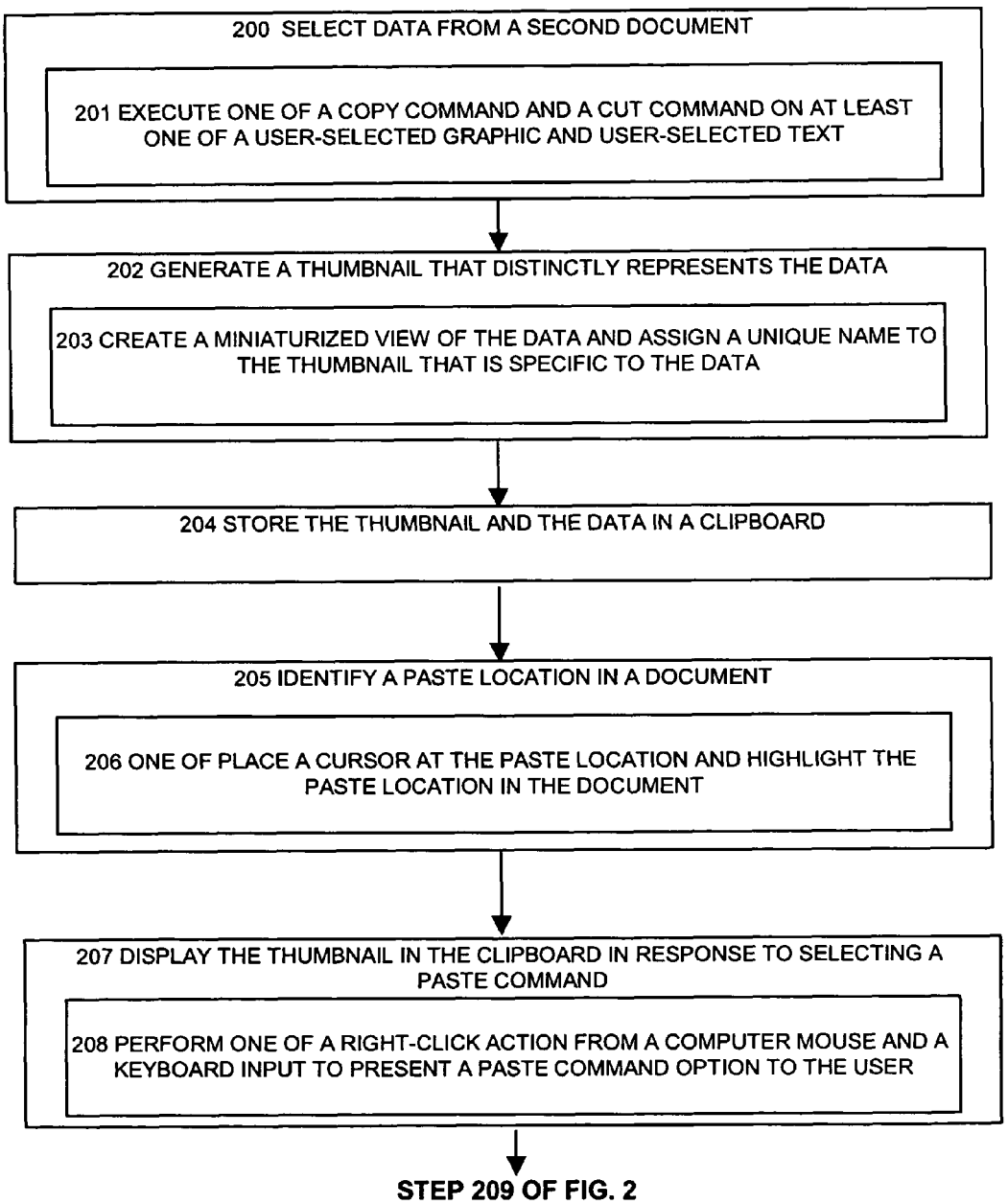
FIG. 3 is a flow chart of processing steps that show high-level processing operations performed by a clipboard manager to create a miniaturized view of data.
Figure 4:
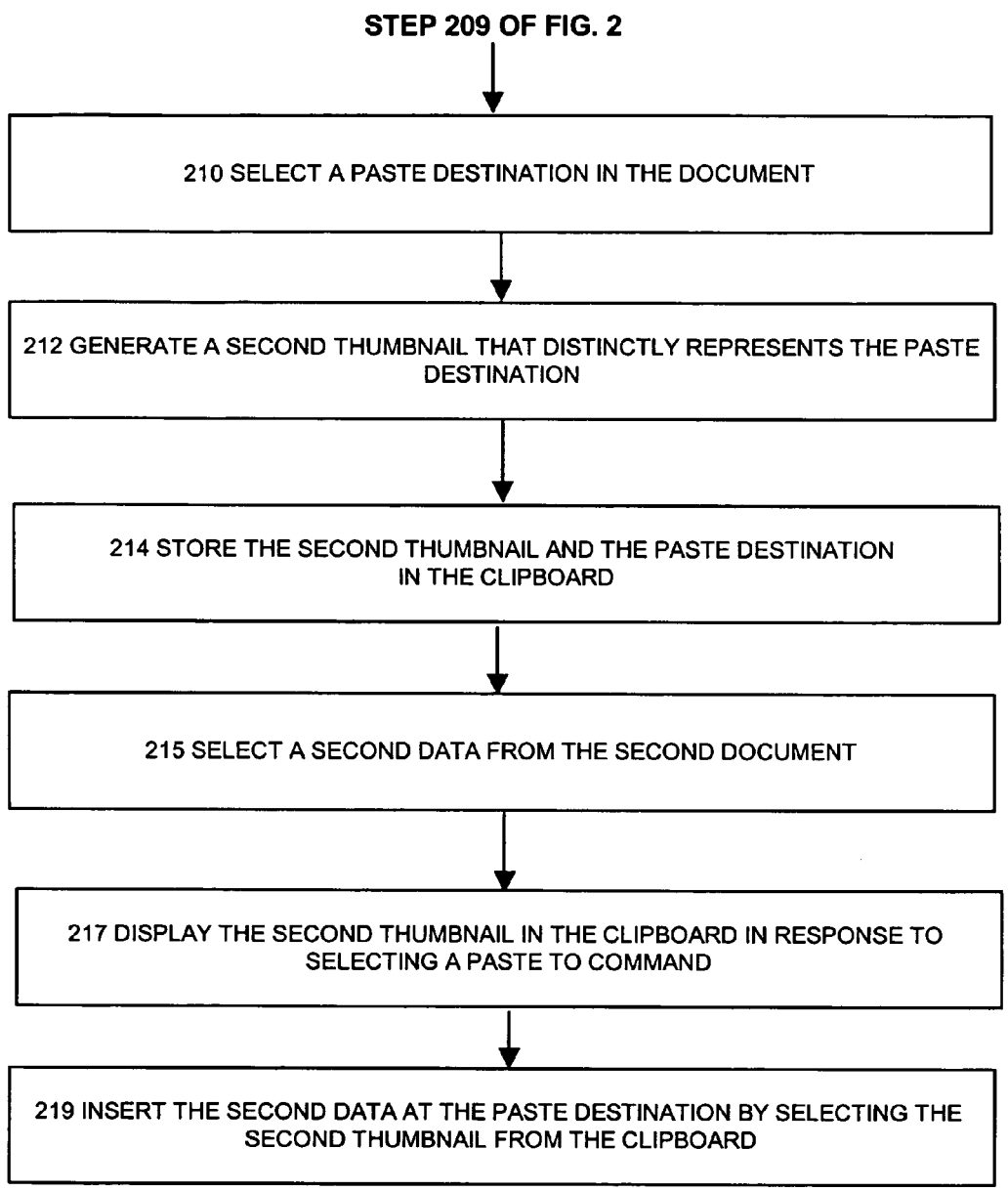
FIG. 4 is a flow chart of processing steps that show high-level processing operations performed by a clipboard manager to display a clipboard with a thumbnail that distinctly represents a paste destination.
Figure 5:
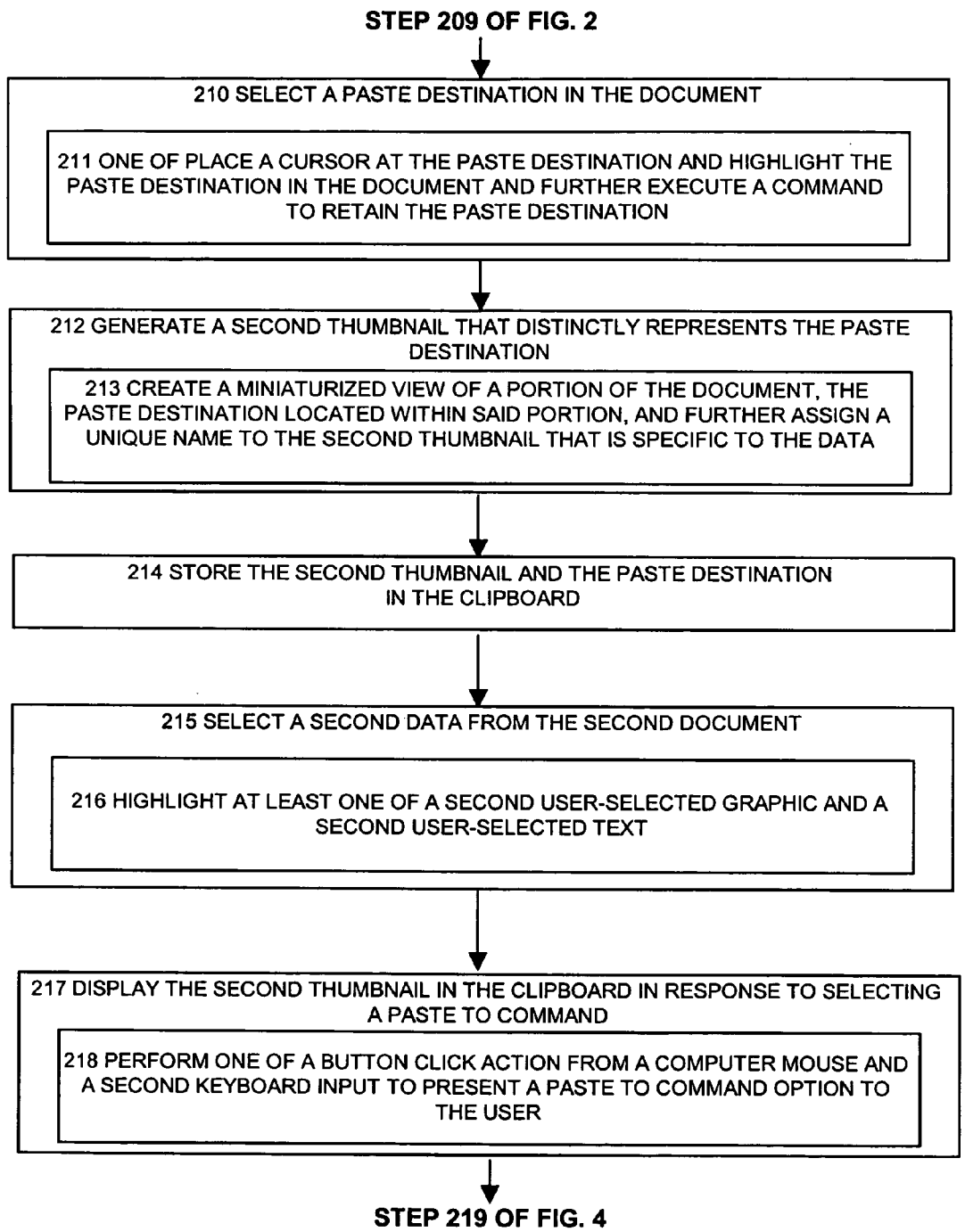
FIG. 5 is a flow chart of processing steps that show high-level processing operations performed by a clipboard manager to create a miniaturized view of a paste destination.
Figure 6:
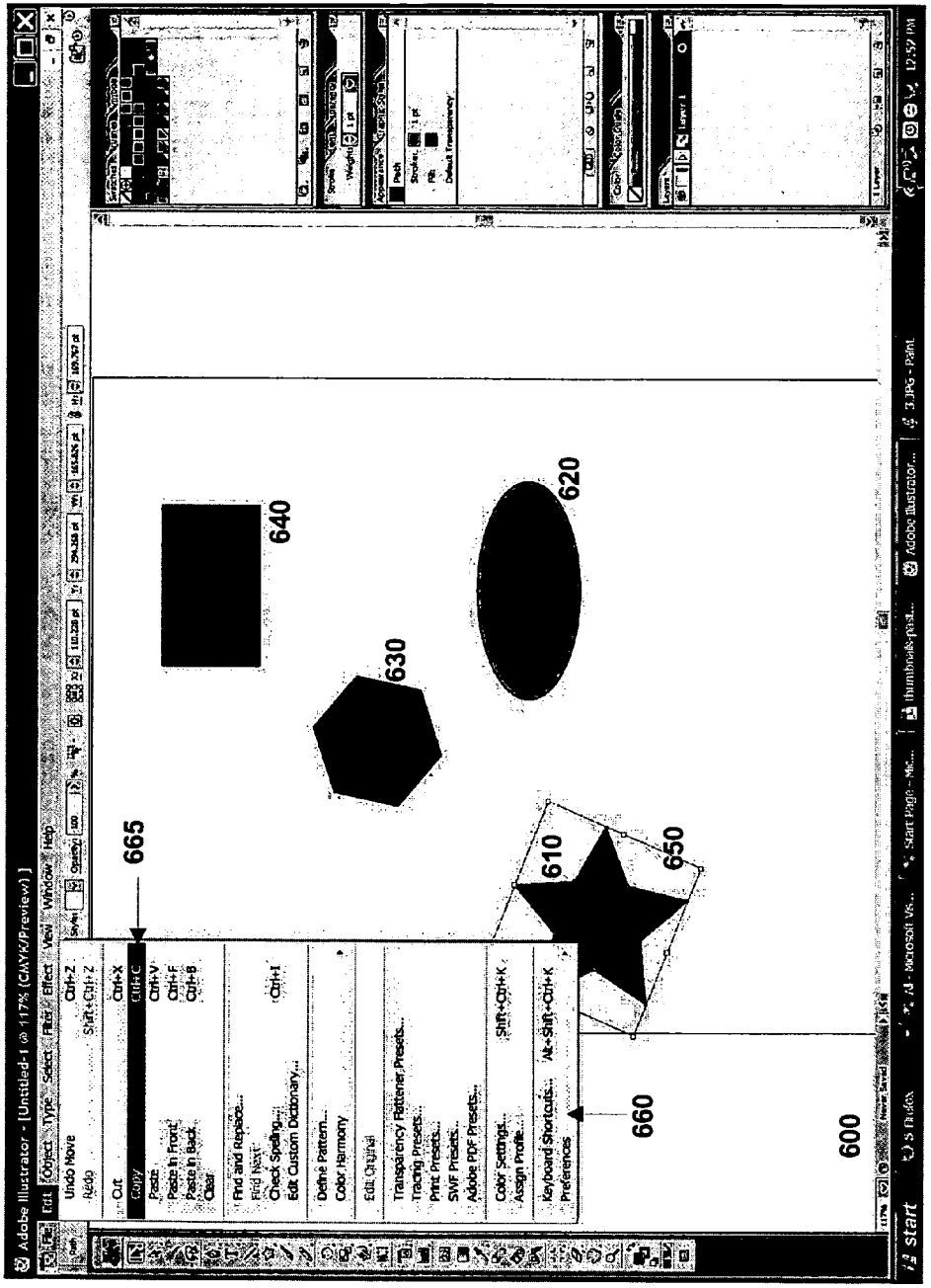
FIG. 6 is a diagram of an application interface that shows a clipboard manager to select graphic data.
Figure 7:
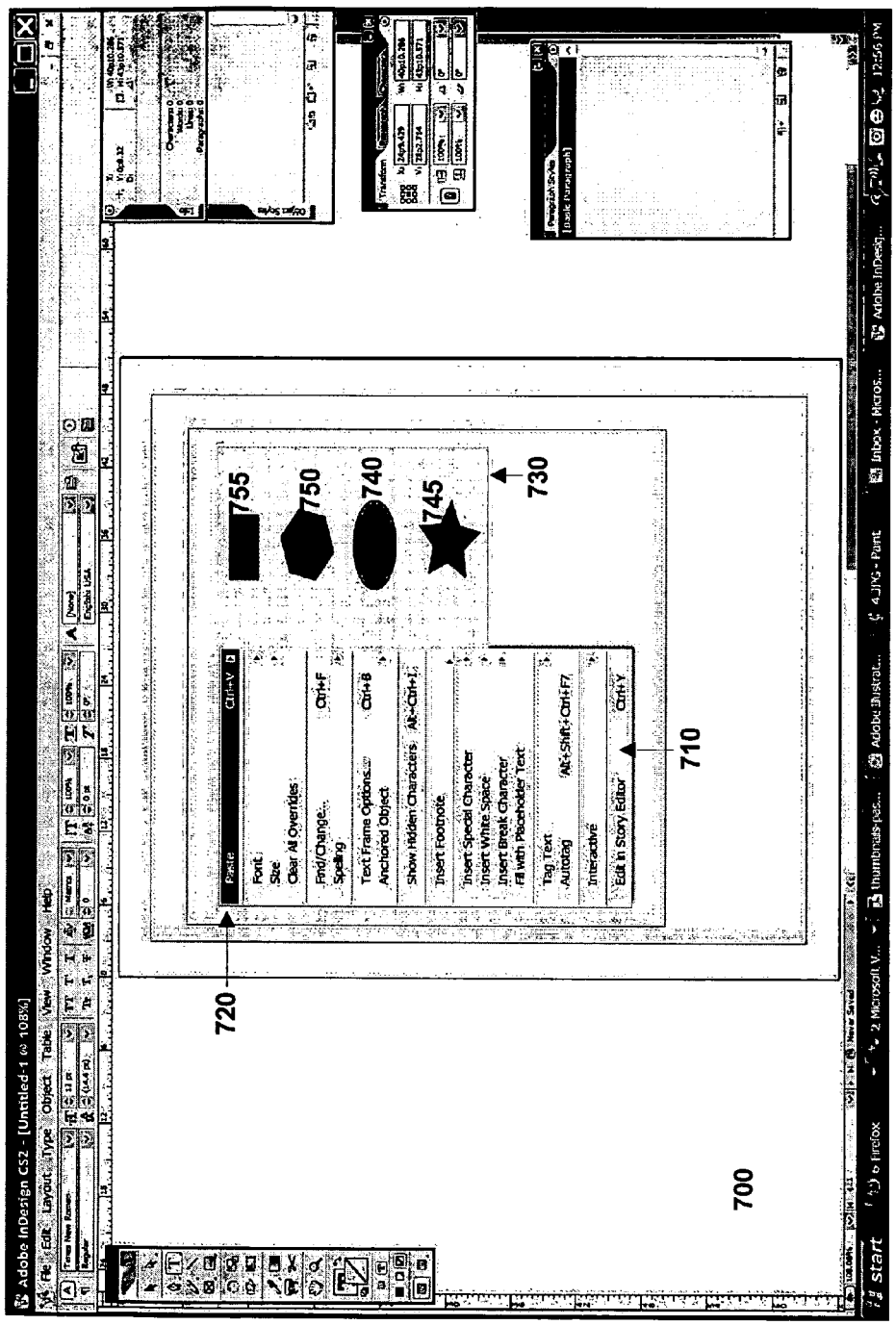
FIG. 7 is a diagram of an application interface that shows a clipboard manager and a clipboard with thumbnails that distinctly represent graphic data.
Figure 8:
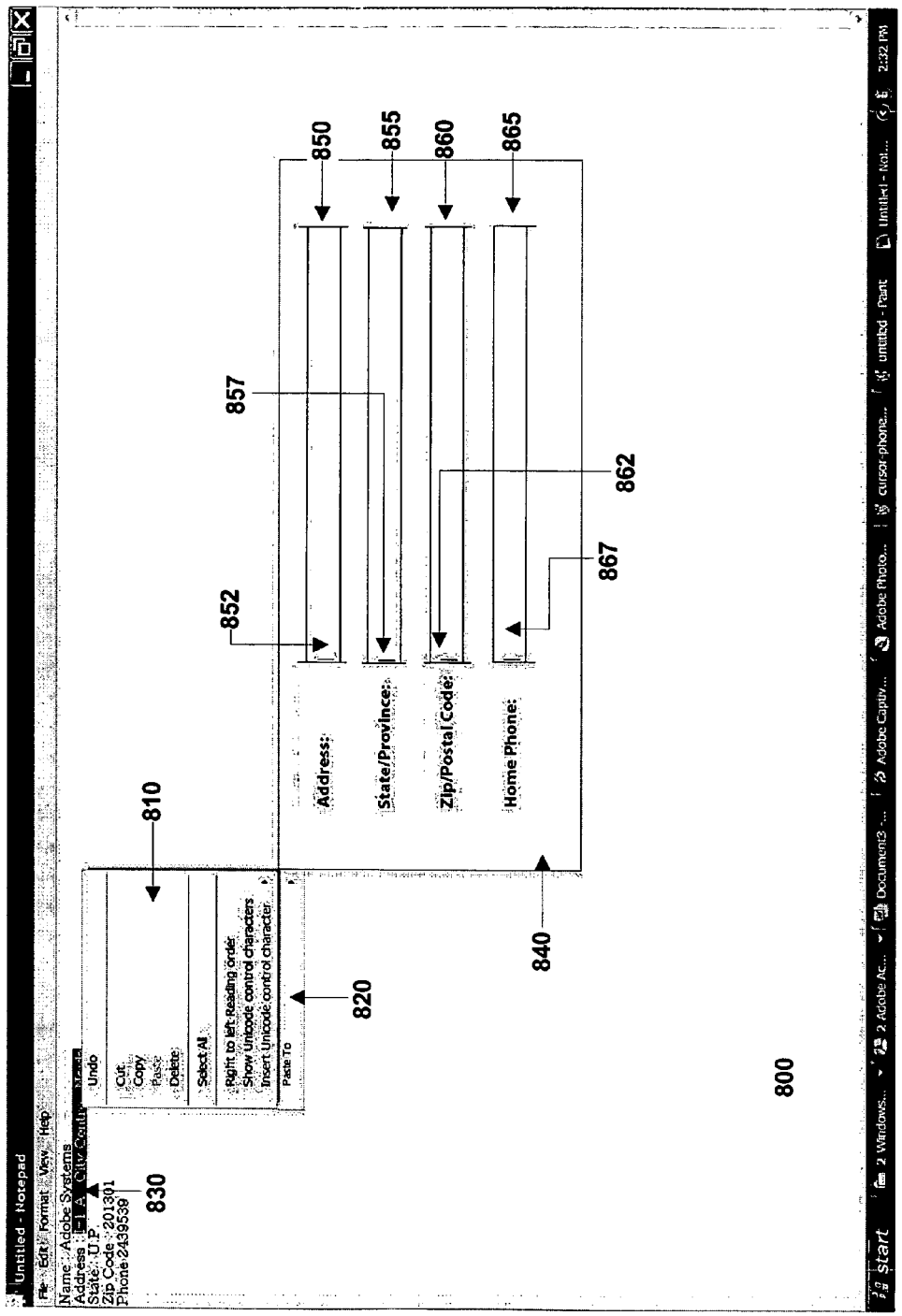
FIG. 8 is a diagram of an application interface that shows a clipboard manager and a clipboard with thumbnails that distinctly represent paste destinations.

Further details of configurations explained herein will now be provided with respect to the flow charts of FIGS. 2 to 5 which represent processing steps that show the high level operations disclosed herein to perform the clipboard manager process 150-2. FIGS. 2 & 3 represent processing steps 200 to 209, and FIGS. 4 & 5 represent processing steps 210 to 219. Additionally, the processing details of the steps represented in FIGS. 2 to 5 will be described in conjunction with an example operation of the clipboard manager 150 as illustrated in FIGS. 6 to 8.

A user 108 can be creating and working on a document of a first software application that belongs to a software suite which also includes a second software application. A person having ordinary skill in the art would understand that a software suite, also known as an application suite, is a collection of computer programs, usually application software and programming software of related functionality, often sharing a more-or-less common user interface and some ability to smoothly exchange data with each other. For example, software applications such as Adobe Illustrator, Adobe InDesign, Adobe Framemaker, and Adobe Photoshop, each manufactured by Adobe Systems Incorporated of San Jose, Calif., can be considered as having related functionality and the ability to smoothly exchange data with each other. Such a clipboard manager application 150-1 and process 150-2, as discussed in this document, can be an example of the related functionality of a software suite.

Referring now to FIG. 2, at step 200, where a user edits a document by employing the clipboard manager 150 to select data from a second document. The second document can belong to a second software application of a software suite that shares the functionality of the clipboard manager 150 with a document of a first software application. The user 108 employs the clipboard manager 150 within the second document in order to initiate an editing process for the document of the first software application. As in the example of FIG. 6, the second document 600 of the second software application is shown as containing multiple graphics. Specifically, such multiple graphics are a star graphic 610, an oval graphic 620, a hexagon graphic 630 and a rectangle graphic 640. The editing process can include a transfer of data of each graphic 610, 620, 630, 640 to the document of the first software application.

In step 201, the user 108 employs the clipboard manager 150 to select the data from the second document by executing one of a copy command and a cut command on at least one of a user-selected graphic and user-selected text. Referring still to the example of FIG. 6, the user 108 can select the star graphic 610, displayed by the highlighting square 650 surrounding the star graphic 610. The user 108 can activate a drop down menu 660 to present a variety of options that can be performed on the star graphic 610. The user 108 can select a copy command 665 from the drop down menu 660. Since the star graphic 610 is currently chosen by the user, as indicated by the highlighting square 650, the copy command 665 will be performed on the star graphic 610. The user 108 can similarly execute the same copy command 650 process on the oval graphic 620, the hexagon graphic 630 and the rectangle graphic 640.

It is understood that such a copy command 650 process is not limited to single graphical elements. A person having ordinary skill in the art would understand that text, as in text, text strings, or portions of a digital document, can be included in the copy command 650 process. Further, text and graphics can be incorporated in a single copy command 650 process. Finally, a cut command can also be performed which, if performed on the star graphic 610 for example, would retain the data of the star graphic 610 but also remove the star graphic 610 from the second document 600.

In step 202, the clipboard manager 150 generates a thumbnail that distinctly represents the data. In response to the copy command 650 process, the data selected from the second document 600 is retained, such as graphic data for the star graphic 610, the oval graphic 620, the hexagon graphic 630 and the rectangle graphic 640. The clipboard manager 150 can process the retained data from the graphics 610, 620, 630, 640 and generate a thumbnail for each graphic. Use of the term thumbnail need not be interpreted as a standardized icon that merely describes the document type of second document 600, or merely relates to the second software application of the second document 600. A thumbnail can be a distinct representation of the data such that the user 108 is given a high degree of context throughout the editing process.

Specifically, in step 203 of FIG. 3 the clipboard manager 150 generates the thumbnail that distinctly represents the data by creating a miniaturized view of the data and assigning a unique name to the thumbnail that is specific to the data. Turning now to the example of FIG. 7, the clipboard 730 is shown as containing four distinct thumbnails 740, 745, 750, 755. Each thumbnail in the clipboard 730 is a distinct representation of a graphic that was copied from FIG. 6. For instance, thumbnail 745 is a miniaturized view of the star graphic 610 in FIG. 6. Thumbnail 740 is a miniaturized view of the oval graphic 620 in FIG. 6. Thumbnail 750 is a miniaturized view of the hexagon graphic 630 in FIG. 6 and thumbnail 755 is a miniaturized view of the rectangle graphic 640 in FIG. 6.

In FIG. 2, at step 204, the clipboard manager 150 stores the thumbnail and the data in a clipboard. The thumbnail is stored in the clipboard so as to be presented to the user 108 when the clipboard is activated. The data which is distinctly represented by the thumbnail, is stored in the clipboard as well. However, the data is presented to the user 108 by way of the miniaturized view of the thumbnail. The data is stored via short-term storage associated with the clipboard. Therefore, if the user 108 chooses to select the thumbnail from the clipboard, the data can be pulled from the short-term storage and does not have to be accessed from the data's originating document or software application.

In step 205, the user 108 employs the clipboard manager 150 to identify a paste location in the document. At step 206, the clipboard manager 150 identifies the paste location in the document by at least one of placing a cursor at the paste location and highlighting the paste location in the document. For example, a user 108 can operate a computer mouse to guide a cursor or pointer throughout the document. As the cursor encounters the paste location in the document that the user 108 wishes to edit, the user 108 can place the cursor at that particular location. However, the user 108 can use a highlighting technique to identify a paste location in the document. For instance, the user 108 can highlight content in the document and the highlighted content itself will be treated as a paste location. Therefore, the highlighted content will be replaced with the data that is being inserted into the paste location.

In step 207, the clipboard manager 150 displays the thumbnail in the clipboard in response to selecting a paste command. In step 208, using the clipboard manager 150, the user 108 can select the paste command by performing one of a right-click action from a computer mouse and a keyboard input to present a paste command option to the user. The keyboard input can be a 'hot key' combination such as requiring the user 108 to press the 'ctrl' and 'v' buttons simultaneously to present the paste command option. Referring back to FIG. 7, the clipboard 730 is presented after the user 108 has performed a right-click action from a computer mouse. As shown, a menu 710 is presented to the user 108 which shows the paste command 720 as an option which the user 108 can select. It is important to note that a clipboard functionality is not listed in the menu 710, however, the clipboard 730 is displayed. In FIG. 7, the user 108 need not spend time scrolling through the menu 710 to find the clipboard functionality or explicitly activate the clipboard 730. Instead, the clipboard 730 displays the thumbnails 740, 745, 750, 755 in response to selecting the paste command 720. Paste command 720 selection can be different than paste command 720 execution. Paste command 720 selection is shown in FIG. 7, where the paste command 720 option is being highlighted by the user. Such selection and highlighting of the paste command 720 can trigger the display of the clipboard 730. By displaying the clipboard 730 as the user 108 selects and highlights the paste command 720 option in the menu 710, editing documents belonging to a software suite is made more efficient. Such displayed clipboard 730 eliminates the user 108 having to scroll through a centralized menu to locate clipboard functionality, thereby creating a more intuitive user experience. Further, the clipboard 730 can be presented proximate to the paste location and can also be presented in a location customized by the user 108.

Further, FIG. 7 shows the advantages provided by the clipboard manager's 150 novel display of thumbnails 740, 745, 750, 755 in the clipboard 730. The user 108 can clearly see the data in the clipboard 730 which provides the user 108 with context as to the content of the data in the clipboard 730 because each thumbnail distinctly represents data via a miniaturized view. Even a second user 108 can continue the editing process with the clipboard 730 regardless if the second user 108 was involved in selecting the data. The second user 108 can clearly see that the data represented by each thumbnail is that of a star graphic 610, an oval graphic 620, a hexagon graphic 630 and a rectangle graphic 640, respectively (See FIG. 6). If the thumbnails 740, 745, 750, 755 did not distinctly represent data, then the second user 108 would not be able to continue the editing process without having to spend time familiarizing himself with the data 610, 620, 630, 640.

Returning to FIG. 2, at step 209, the clipboard manager 150 inserts the data at the paste location by selecting the thumbnail from the clipboard. For instance, based on the interface diagram of FIG. 7, the user 108 can select the star graphic thumbnail 745 by, for example, double-clicking on the thumbnail 745 with a computer mouse. The clipboard manager 150 can pull the data for the star graphic 610 from the short-term storage associated with the clipboard 730 and insert the start graphic 610 at the paste location that was earlier identified in the document. Hence, the clipboard manager 150 allows for a complete and smooth transfer of the star graphic 610 from a second document into a document being edited by the user.

The clipboard manager 150 can also store thumbnails of paste destinations in addition to storing thumbnails of data. In FIG. 4, at step 210, the user 108 can employ clipboard manager 150 to select a paste destination in the document. In step 211, the clipboard manager 150 selects the paste destination in the document by at least one of placing a cursor at the paste destination and highlighting the paste destination in the document and further comprises executing a command to retain the paste destination. For example, the user 108 can operate a computer mouse to guide a cursor or pointer throughout the document. As the cursor encounters the paste destination in the document where the user 108 wishes to edit, the user 108 can place the cursor at that particular destination. However, the user 108 can use a highlighting technique to identify a paste destination in the document. For instance, the user 108 can highlight content in the document and the highlighted content itself will be treated as a paste destination. Therefore, the highlighted content will be replaced with the data that is being inserted into the paste destination.

At step of 212 of FIG. 4, once the clipboard manager 150 executes a command to retain the paste destination, the clipboard manager 150 generates a second thumbnail that distinctly represents the paste destination. Further, in step 213 of FIG. 5, the clipboard manager 150 generates the second thumbnail that distinctly represents the paste destination by creating a miniaturized view of a portion of the document, the paste destination located within said portion, and further assigning a second unique name to the second thumbnail that is specific to the paste destination. For example, referring now to FIG. 8, a clipboard 840 is shown as containing four thumbnails 850, 855, 860, 865 that distinctly represent four individual paste destinations. Specifically, thumbnail 850 is a thumbnail that shows a miniaturized view of the paste destination 852, where the cursor appears, and the portion surrounding the paste destination 852 is the text box and the text that reads: "Address." Thumbnail 855 is a thumbnail that shows a miniaturized view of the paste destination 857, where the cursor appears, and the portion surrounding the paste destination 857 is the text box and the text that reads: "State/ Province." Thumbnail 860 is a thumbnail that shows a miniaturized view of the paste destination 862, where the cursor appears, and the portion surrounding the paste destination 862 is the text box and the text that reads: "Zip/Postal Code." Thumbnail 865 is a thumbnail that shows a miniaturized view of the paste destination 867, where the cursor appears, and the portion surrounding the paste destination 867 is the text box and the text that reads: "Home Phone."

In step 214, the clipboard manager 150 stores the second thumbnail and the paste destination in the clipboard. The thumbnail 850, 855, 860, 865 is stored in the clipboard 840 so as to be presented to the user 108 when the clipboard is activated. The paste destination, which is distinctly represented by the thumbnail, is stored in the clipboard as well. However, the paste destination is presented to the user 108 by way of the miniaturized view of the thumbnail. The paste destination is stored via short-term storage associated with the clipboard 840. Therefore, if the user 108 chooses to select the thumbnail from the clipboard 840, the actual paste destination can be read from the short-term storage and does not have to be read from the paste destination's originating document or software application.

In step 215, the user can employ the clipboard manager 150 to select a second data from the second document. In step 216, the clipboard manager 150 selects the second data from the second document by highlighting at least one of a second user-selected graphic and a second user-selected text. For example, in FIG. 8, the user 108 can select address data 830 from the document 800 that is intended to be inserted into at a paste destination represented by thumbnail 850 in the clipboard 840.

In step 217, the clipboard manager 150 displays the second thumbnail in the clipboard in response to selecting a "paste to" command. In step 218, the clipboard manager 150 selects the "paste to" command by performing one of a button action from a computer mouse and a second keyboard input, such as a 'hot key' combination, to present a "paste to" command option to the user. Referring back to FIG. 8, the clipboard 840 is presented after the user 108 has performed a button action from a computer mouse. As shown, a menu 810 is presented to the user 108 which shows the "paste to" command 820 as an option which the user 108 can select. It is important to note that a clipboard functionality is not listed in the menu 810, however, the clipboard 840 is displayed. In FIG. 8, the user 108 need not spend time scrolling through the menu 810 to find the clipboard functionality or explicitly activate the clipboard 840. Instead, the clipboard 840 displays the thumbnails 850, 855, 860, 865 in response to selecting the "paste to" command 820. "Paste to" command 820 selection can be different than "paste to" command 820 execution. "Paste to" command 820 selection is shown in FIG. 8, which can trigger the display of the clipboard 840. By displaying the clipboard 840 as the user 108 selects the "paste to" command 820 option in the menu 810, editing documents in a software suite is made more efficient. Such displayed clipboard 840 eliminates the user 108 having to scroll through a centralized menu to locate clipboard functionality, thereby creating a more intuitive user 108 experience during editing documents. Further, the clipboard 840 can be presented proximate to at least one of a second user-selected graphic and a second user-selected text and can also be presented in a location customized by the user 108.

Further, FIG. 8 shows the advantages provided by the clipboard manager's 150 novel display of thumbnails 850, 855, 860, 865 in the clipboard 840. The user 108 can clearly see the paste destinations in the clipboard 840 which provides the user 108 with context as to the placement of the paste destination because each thumbnail distinctly represents a clear representation of the paste destination. Even a second user 108 can continue the editing process with the clipboard 840 regardless if the second user 108 was involved in selecting the paste destinations from the document. If the thumbnails 850, 855, 860, 865 did not distinctly represent paste destinations, the second user 108 would not be able to continue the editing process without having to spend time familiarizing himself with where the paste destinations actually are placed in the document.

Returning to FIG. 4, at step 219, the clipboard manager 150 inserts the second data at the paste destination by selecting the second thumbnail from the clipboard 840. For instance, based on the interface diagram of FIG. 8, the user 108 can select the address paste destination thumbnail 850 by, for example, double-clicking on the thumbnail 850 with a computer mouse. The clipboard manager 150 can read the address paste destination from the short-term storage associated with the clipboard 850 and insert the address data 830 in the second document 800 at the paste location 852. Hence, the clipboard manager 150 allows for a complete and smooth transfer of the address data 830 from a second document into the paste destination 852 of the document being edited by the user.

Note again that techniques herein are well suited for employing a clipboard manager 150 to display a clipboard with thumbnails that distinctly represent data while editing a document. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application and the invention as defined by the appended claims. It is, of course, not possible to describe every conceivable combination of components or methodologies for purposes of describing the invention, but one of ordinary skill in the art may recognize that many further combinations and permutations of the invention are possible. Accordingly, all such alterations, modifications and variations are intended to be covered by the scope of this present application. As such, the foregoing description of embodiments of the present application is not intended to be limiting. Rather, any limitations to the invention are presented in the following claims.

What is claimed is:

1. A computer-implemented method comprising:
generating a first thumbnail in response to selection of a paste destination in a first document, wherein generating the first thumbnail includes: generating a miniaturized view of a text input box and a text input box label, wherein the paste destination is positioned within the text input box, the paste destination comprising a location in the first document at which to insert document content selected from a second document, the first thumbnail comprising a miniaturized pictorial representation of (i) the paste destination in the first document and (ii) a portion of the first document surrounding the paste destination, the first document different than the second document;
upon detecting selection of the document content from the second document, displaying the first thumbnail in conjunction with display of the second document;
while the second document is currently displayed, inserting the selected document content into the paste destination in response to detecting selection of the first thumbnail;
upon detecting selection of second document content from the second document, generating a second thumbnail, the second thumbnail comprising a pictorial representation of the second document content;
while the first document is displayed, detecting selection of a paste location in the first document;
upon receiving selection of a paste command, displaying the second thumbnail in conjunction with display of the first document; and
upon detecting selection of the second thumbnail, inserting the second document content into to the paste location in the currently displayed first document.

2. The computer-implemented method of claim 1, comprising:
wherein generating the first thumbnail includes:
generating a miniaturized view of multiple text input boxes provided in the first document, the miniaturized view including a display of a text input box label of each respective text input box, wherein the paste destination is located within a particular text input box from the multiple text input boxes; and
wherein inserting the selected document content into the paste destination includes: inserting the selected document content into the particular text input box in the first document.

3. The computer-implemented method of claim 1, comprising:
wherein generating the first thumbnail includes:
generating a miniaturized view of a text input box and a text input box label currently placed in the first document, wherein the paste destination is positioned within the text input box;
wherein inserting the selected document content into the paste destination includes:
inserting the selected document content into the text input box in the first document; and
the computer-implemented method further comprises:
upon detecting selection of second document content from the second document, generating a second thumbnail, the second thumbnail comprising a pictorial representation of the second document content;
while the first document is displayed, detecting selection of a paste location in the first document;
upon receiving selection of a paste command, displaying the second thumbnail in conjunction with display of the first document; and
upon detecting selection of the second thumbnail, inserting the second document content into to the paste location in the currently displayed first document.

4. A non-transitory computer readable storage medium comprising executable instructions encoded thereon operable on a computerized device to perform processing comprising instructions for:
generating a first thumbnail in response to selection of a paste destination in a first document, wherein the instructions for generating the first thumbnail include: instructions for generating a miniaturized view of a text input box and a text input box label, wherein the paste destination is positioned within the text input box, the paste destination comprising a location in the first document at which to insert document content selected from a second document, the first thumbnail comprising a miniaturized pictorial representation of (i) the paste destination in the first document and (ii) at least a portion of the first document surrounding the paste destination, the first document different than the second document;
upon detecting selection of the document content from the second document, displaying the first thumbnail in conjunction with display of the second document;
while the second document is currently displayed, inserting the selected document content into the paste destination in response to detecting selection of the first thumbnail;
upon detecting selection of second document content from the second document, generating a second thumbnail, the second thumbnail comprising a pictorial representation of the second document content;
while the first document is displayed, detecting selection of a paste location in the first document;
upon receiving selection of a paste command, displaying the second thumbnail in conjunction with display of the first document; and
upon detecting selection of the second thumbnail, inserting the second document content into to the paste location in the currently displayed first document.

5. The non-transitory computer readable storage medium of claim 4, comprising:
wherein the instructions for generating the first thumbnail include:
instructions for generating a miniaturized view of multiple text input boxes provided in the first document, the miniaturized view including a display of a text input box label of each respective text input box, wherein the paste destination is located within a particular text input box from the multiple text input boxes; and
wherein the instructions for inserting the selected document content into the paste destination includes: instructions for inserting the selected document content into the particular text input box in the first document.

6. The non-transitory computer readable storage medium of claim 4,
wherein the instructions for generating the first thumbnail include:
instructions for generating a miniaturized view of a text input box and a text input box label currently placed in the first document, wherein the paste destination is positioned within the text input box;

wherein the instructions for inserting the selected document content into the paste destination includes:
instructions for inserting the selected document content into the text input box in the first document; and
the computer-implemented method further comprises instructions for:
upon detecting selection of second document content from the second document, generating a second thumbnail, the second thumbnail comprising a pictorial representation of the second document content;
while the first document is displayed, detecting selection of a paste location in the first document;
upon receiving selection of a paste command, displaying the second thumbnail in conjunction with display of the first document; and
upon detecting selection of the second thumbnail, inserting the second document content into to the paste location in the currently displayed first document.

7. A computer system comprising:

a processor;

a memory unit that stores instructions associated with an application executed by the processor; and an interconnect coupling the processor and the memory unit, enabling the computer system to execute the application and perform operations of: generating a first thumbnail in response to selection of a paste destination in a first document, wherein generating the first thumbnail includes generating a miniaturized view of a text input box and a text input box label, wherein the paste destination is positioned within the text input box, the paste destination comprising a location in the first document at which to insert document content selected from a second document, the first thumbnail comprising a miniaturized pictorial representation of (i) the paste destination in the first document and (ii) at least a portion of the first document surrounding the paste destination, the first document different than the second document;

upon detecting selection of the document content from the second document, displaying the first thumbnail in conjunction with display of the second document;

while the second document is currently displayed, inserting the selected document content into the paste destination in response to detecting selection of the first thumbnail;

upon detecting selection of second document content from the second document, generating a second thumbnail, the second thumbnail comprising a pictorial representation of the second document content;

while the first document is displayed, detecting selection of a paste location in the first document;

upon receiving selection of a paste command, displaying the second thumbnail in conjunction with display of the first document; and upon detecting selection of the second thumbnail, inserting the second document content into to the paste location in the currently displayed first document.

8. The computer system of claim 7, wherein generating the first thumbnail includes:
generating a miniaturized view of a text input box and a text input box label, wherein the paste destination is positioned within the text input box.

9. The computer system of claim 7, comprising:
upon detecting selection of second document content from the second document, generating a second thumbnail, the second thumbnail comprising a pictorial representation of the second document content;
while the first document is displayed, detecting selection of a paste location in the first document;
upon receiving selection of a paste command, displaying the second thumbnail in conjunction with display of the first document; and
upon detecting selection of the second thumbnail, inserting the second document content into to the paste location in the currently displayed first document.

\* \* \* \* \*

UNITED STATES PATENT AND TRADEMARK OFFICE
CERTIFICATE OF CORRECTION

Page 1 of 2

PATENT NO.      : 7,853,888 B1
APPLICATION NO. : 11/652980
DATED           : December 14, 2010
INVENTOR(S)     : Anmol Dhawan et al.

It is certified that error appears in the above-identified patent and that said Letters Patent is hereby corrected as shown below:

Col. 13, Claim 7, Line 37
Delete the word "to"

Col. 14, Claim 8:
Delete lines 1-5 and insert the following in place thereof:
  --8.  The computer system of claim 7, comprising:
    wherein generating the first thumbnail includes:
      generating a miniaturized view of multiple text input boxes
      provided in the first document, the miniaturized view including a
      display of a text input box label of each respective text
      input box, wherein the paste destination is located within a
      particular text input box from the multiple text input boxes; and
    wherein inserting the selected document content into the paste destination
      includes:
      inserting the selected document content into the particular text
      input box in the first document.--

Col. 14, Claim 9:
Delete lines 1-13 and insert the following in place thereof:
  --9.  The computer system of claim 7, comprising:
    wherein generating the first thumbnail includes:
      generating a miniaturized view of a text input box and a text input
      box label currently placed in the first document, wherein the paste
      destination is positioned within the text input box;
    wherein inserting the selected document content into the paste destination
      includes:
      inserting the selected document content into the text input box in
      the first document; and
      the computer-implemented method further comprises:

Signed and Sealed this
Twenty-fourth Day of May, 2011

David J. Kappos
*Director of the United States Patent and Trademark Office* upon detecting selection of second document content from the second document, generating a second thumbnail, the second thumbnail comprising a pictorial representation of the second document content;

while the first document is displayed, detecting selection of a paste location in the first document;

upon receiving selection of a paste command, displaying the second thumbnail in conjunction with display of the first document; and upon detecting selection of the second thumbnail, inserting the second document content into to the paste location in the currently displayed first document.--